(12) United States Patent
Birk

(10) Patent No.: US 7,308,866 B2
(45) Date of Patent: Dec. 18, 2007

(54) METHODS OF MANAGING ANIMALS AND MILKING STATION

(75) Inventor: Uzi Birk, Huddinge (SE)

(73) Assignee: Delaval Holdings AB, Tumba (SE)

( * ) Notice: Subject to any disclaimer, the term of this patent is extended or adjusted under 35 U.S.C. 154(b) by 403 days.

(21) Appl. No.: 10/491,922

(22) PCT Filed: Oct. 3, 2002

(86) PCT No.: PCT/SE02/01797

§ 371 (c)(1),
(2), (4) Date: Apr. 8, 2004

(87) PCT Pub. No.: WO03/030629

PCT Pub. Date: Apr. 17, 2003

(65) Prior Publication Data

US 2004/0261723 A1    Dec. 30, 2004

(30) Foreign Application Priority Data

Oct. 8, 2001    (SE) .................................... 0103343

(51) Int. Cl.
*A01J 3/00*    (2006.01)
(52) U.S. Cl. ................ 119/14.03; 119/14.01; 119/14.02; 119/51.02; 119/520
(58) Field of Classification Search ............ 119/14.01, 119/14.02, 14.03, 14.08, 51.02, 520, 521, 119/524

See application file for complete search history.

(56) References Cited

U.S. PATENT DOCUMENTS

| | | | |
|---|---|---|---|
| 5,596,945 A | 1/1997 | van der Lely | |
| 6,516,744 B1 * | 2/2003 | Bjork et al. ............. | 119/14.02 |

FOREIGN PATENT DOCUMENTS

| | | |
|---|---|---|
| EP | 0 189 954 | 8/1986 |
| EP | 0 332 230 | 9/1989 |
| EP | 636312 A1 * | 2/1995 |
| EP | 0 768 027 | 4/1997 |
| NL | 8903163 | 7/1991 |
| WO | WO 96/19917 | 7/1996 |

* cited by examiner

*Primary Examiner*—Michael J. Carone
*Assistant Examiner*—Willie Berry, Jr.
(74) *Attorney, Agent, or Firm*—Harness, Dickey & Pierce, P.L.C.

(57) ABSTRACT

Example embodiments related to a method of automatically milking animals, wherein the animals are allowed to move in area intended therefore. The area may include a resting area and a feeding area housing a milking station, whereby the animals are allowed to visit individually and which a selected group of the animals have to visit in order to move from the resting area to the feeding area. The method may establish a condition for low utilization of the milking station; and feed the animals by a feeding device when the condition for low utilization of the automatic milking machine is met to thereby entice animals in the resting area to move to the feeding area and to therewith present themselves at the milking station.

21 Claims, 1 Drawing Sheet

METHODS OF MANAGING ANIMALS AND MILKING STATION

This application claims priority from International Patent Application No. PCT/SE02/01797, filed on Oct. 3, 2002, and Swedish patent Application No. 0103343-0, filed on Oct. 8, 2001, in the Swedish Intellectual Property Office.

TECHNICAL FIELD OF THE INVENTION

The present invention generally relates to dairy farming, and more specifically the invention relates to a method of managing milking animals and to a milking station.

DESCRIPTION OF RELATED ART AND BACKGROUND OF THE INVENTION

A main trend in modern dairy farm industry is an increased degree of automation. For instance, machine milking may be performed by automatic milking machines in a completely automated manner. Further, fully automated animal managing systems may take care of milking, feeding, milk inspection, milk sampling, animal traffic, etc. in an area wherein the dairy animals are walking about freely and are visiting the milking machines on a voluntary basis.

An automated milking machine involves large costs and has a limited milk production capacity. Thus, in order to obtain a high utilization of the automated milking machine, which animals are visiting on a voluntary basis, it should be operated as frequently as possibly, most preferably continuously during day and night. Further, animals having a high milk production should be milked more often than animals having a low milk production. The operation and use of an automated milking machine in order to obtain an optimal milk production is an arduous task. Naturally, ethical aspects as well as animal care have to be considered.

EP 0 332 230 A2 (VAN DER LELY) discloses a method of automatically milking animals, which are allowed to visit individually a milking parlor comprising a milking robot and an animal identification system. The milking animals make a more or less regular appearance in the milking parlor, and can be lured to the milking parlor by the presence of concentrate or by calling the animals by means of sound signals. To this end each animal has a collar with a receiver attached thereto, which is connected to a loudspeaker located in the region of the animal's ears. By means of sending a call signal with agreeable sounds each desired animal can be invited to go to the milking parlor, while other animals can be hindered to go the milking parlor by means of an unpleasant signal.

While such methods include enticing animals to the milking parlor, they do not suggest when to entice the animals. Animal selective enticing means are often used to entice particular animals, i.e. animals having a large milk production or animals, which have not been milked for a long time, to present themselves at the milking machine.

SUMMARY OF THE INVENTION

However, the present inventor has noticed that in automatic milking stations of today, which milking animals are allowed to visit individually, there arise animal queues or lines at the entry to the stations during some periods of time, while during other periods of time the milking station is free and unexploited. Such situation leads to a low utilization of the capacity of the milking station. In order to optimize the capacity utilization, the milking station ought to be used more continuously.

It is therefore an object of the present invention to provide a method of managing milking animals, which are allowed to move in an area intended therefore, the area including a resting area and a feeding area and housing a milking station, which the animals are allowed to visit individually and which they have to visit in order to move from the resting area to the feeding area, which method provides for a higher milking machine utilization than do prior art methods.

It is a further object of the invention to provide such an inventive method, which enables a more precise controlling of the frequency, at which each of the milking animals is milked.

It is still a further object to provide such an inventive method, which is simple, reliable, of low cost, and easy to implement.

It is yet a further object of the present invention to provide a milking station in an environment of the above-mentioned kind for carry out the inventive method of managing milking animals.

These objects, among others, are according to the present invention attained by methods, and milking stations as specified in the appended claims.

By the provision of a method, which establishes a criterion for when the milking machine is utilized less frequently and activates an automatic feeding device in the feeding area to entice milking animals in the resting area to search for the feed, animals are effectively drawn through the milking station at periods, which otherwise would experience low traffic of animals. Hereby, a better milking machine utilization is obtained, and as the animals probably visit the milking station more frequently, the frequency at which each of the milking animals is milked, can be more accurately chosen.

Further characteristics of the invention, and advantages thereof, will be evident from the following detailed description of preferred embodiments of the present invention given hereinafter and the accompanying FIG. 1, which is given by way of illustration only, and thus is not limitative of the present invention.

DETAILED DESCRIPTION OF EMBODIMENTS

Figure 1:
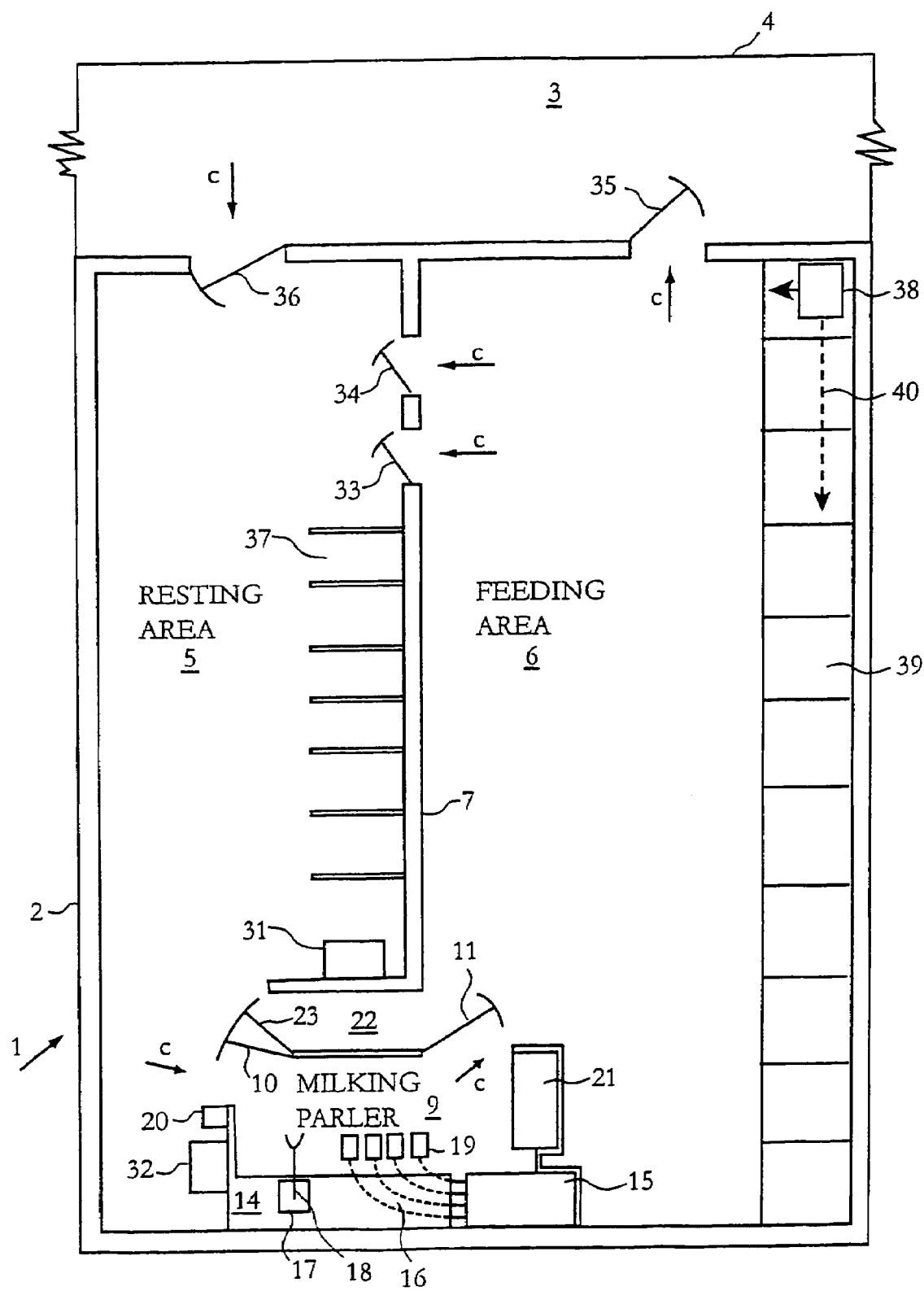
FIG. 1 displays schematically an embodiment of an animal arrangement for housing a herd of cows including a milking station for automatic milking according to the present invention.

In the following detailed description the milk producing animals are cows. However, the invention is not limited to cows, but is applicable to any animals having the capability to produce large quantities of milk, such as sheep, goats, buffaloes, horses, etc.

FIG. 1. discloses an animal arrangement for housing a herd of cows. The arrangement comprises a stable 1 defined by walls 2 and an outdoor area 3 defined by enclosure means 4 in the shape of a fence, a grid or the like. Note that FIG. 1 is not to scale, and particularly area 3 may be much larger as schematically indicated by zigzag formations in enclosure means 4. Further, the stable 1 is divided up into a resting area or stable 5 and a feeding area or stable 6, which are separated by a fence, a wall or similar 7. The stable 1 and the area 3 are arranged to house cows permitted to walk about freely.

In the stable 1, there is provided a milking station or parlor 9 arranged for voluntary milking of the freely walking cows, i.e. the cows enter the milking station 9 in order to be milked. The milking station 9 comprises an enclosure having an inlet gate 10 and an outlet gate 11.

The milking station 9 comprises an automatic milking machine 14 connected to a milk storage tank 15 by means of milk lines 16. The milking machine 14 includes an automatic handling device 17 having a robot arm 18 arranged to automatically apply teat cups 19 of the milking machine to the teats of a cow present in the milking station 9.

Furthermore, the milking station 9 comprises an identification member 20 provided to identify a cow approaching the milking station 9. The gates 10 and 11 are controllable by means of a schematically disclosed gate control device 31.

Further, the automatic handling device 17, the identification member 20, and the gate control device 31 are connected to a central processing and control device 32. The central processing and control device 32 is responsible for central processing and controlling of the animal arrangement, and comprises typically a microcomputer, suitable software, and a database of the cows in the stable 1 and the outdoor area 3. Such a database includes typically information of each of the cows, such as e.g. when the respective cow was milked last time, when she was fed last time, her milk production, her health, etc.

Thus a cow approaching the milking station 9 may be given access to the milking station after having been identified by the identification member 20 by means of the inlet gate 10 being opened. Typically, some kind of animal selective milking decision algorithm is applied for determining whether the particular milking animal presented for milking shall be milked or if she shall be led directly through the milking station 9 to the feeding area 6 without being milked. It shall be appreciated that for the latter instance the milking station 9 may be provided with a going through or passage 22 provided with a gate 23, which allow the cow to pass by the milking station 9 without actually enter the space where the milking machine 14 is located.

During milking, milk is drawn from the teats of the cow by means of vacuum being applied to the teat cups 19. The milk drawn is measured by means of one or several milk meters (not illustrated), whereafter it is collected in the milk storage tank 15. Preferably, there is provided a milk meter for each teat cup 19 for measuring the individual milk flow from each teat. Further, each teat cup 19 is preferably connected individually by means of the respective milk lines 16 to the milk storage tank 15.

After the milking has been completed the outlet gate 11 is opened and the cow may leave the milking station 9.

The milking station 9 may also comprise a feeding device 21 provided in the front end of the milking station 9, the purpose of which being to entice the cow to enter the milking station 9 and to make her stand still during at least the attachment of the teat cups.

It shall be noted that the milking station 9 is oriented such that cows in the resting area 5 only are capable of entering the milking station 9 through entry gate 10 and that cows leaving the milking station 9 through the exit gate 11 enter the feeding area 6. Such design is favorable for the management of the cows since it is easier to entice hungry cows to enter the milking station 9 and consequently the feeding area 6 by means of concentrate and other feed in the feeding area 6.

Furthermore, the stable 1 is provided with a number of one-way doors or gates 33-36 to let the cows walk from the feeding area 6 to the outdoor area 3 or to the resting area 5, and from the outdoor area 3 to the resting area 5. In FIG. 1 arrows denoted c indicate schematically the traffic of cows through the various doors and gates of the arrangement. Note particularly that cows in the resting area 5 or in the outdoor area 3 typically need to pass through the milking station 9 in order to reach the feeding area 6.

Alternatively, gates 33-36 are so-called smart gates, that is gates that are easily opened by the cows when they are to move through the gates 33-36 in the directions indicated by the arrows c, while they may still be opened for cows moving in the reverse directions provided that some specific condition is met such as for instance that they do not need to be milked. To this end each of the gates 33-36 may be provided with a respective cow identification member (not illustrated) located adjacent the respective gate, which identifies a cow approaching the gate in the reverse direction. Further, the identification members at the gates 33-36 are each connected to the central processing and control device 32, while the opening of the gates 33-36 for cows moving in the reverse direction is controlled by the gate control device 31. A cow identified by any of the cow identification members at the gates 33-36 may be allowed to pass through the gate in the reverse direction provided that she fulfills a given condition. Typically, some kind of animal selective milking decision algorithm is applied for determining whether the cow shall be allowed to pass through.

Such provisions may be preferred since the traffic of cows, which do not need to be milked for a long time, in vicinity of the milking station 9 may be reduced, and the capacity of the milking machine in the milking station 9 may be better utilized.

Thus, it may be stated that a selected group of the animals in the resting area 5 have to visit the milking station 9 in order to move from the resting area 5 to the feeding area 6. This selected group of animals may be all animals present in the resting area 5, or it may be only some of the animals present in the resting area 5. Further, the group may be changed with time.

The resting area or stable 5 may house a number of resting stalls 37 or similar provided with straws or similar to enable the cows to rest comfortably.

The feeding area or stable 6 houses an automatic feeding device in form of a feed wagon 38 or similar, which is capable of dropping feed into a feeding table, manger, or similar 39, while moving along the feeding table as indicated by arrow 40 to distribute the feed well on the feeding table 39. The feed wagon 39 is an automatic device that is computer controlled from the central processing and control device 32 of the milking station 9. Feed wagons that may be used in the present invention include i.a. DeLaval feed wagon CM, DeLaval feed wagon FC120, and DeLaval feed wagon FCC, all commercially available from DeLaval International AB in Tumba, Sweden. Such feed wagons are movable along a rail (not illustrated) mounted in the ceiling or in the wall of the stable and are provided with a respective automatic feed supply. Typically, the wagons are provided with capability of exact feed dosage of different type of feed including ensilage, concentrate, roughage and minerals.

The feeding is performed typically 3-8 times a day and while dropping the feed onto the feeding table 39 a characteristic sound appears, which the cows rapidly associate with the presence of feed on the feeding table 39.

The present inventor has discovered that a severe drawback of the above-described animal arrangement is that during some periods of time there arise cow queues at the entry to the station 9, while during other periods of time the milking station 9 is free and unexploited. Such situation leads inevitably to a low utilization of the capacity of the milking station 9.

In order to remedy such a problem the present invention provides for a method comprising that a condition or criterion for a low degree of utilization of the automatic milking machine 14 is determined and that the milking animals are fed by means of the automatic feeding device 38 when the condition for a low degree of utilization of the automatic milking machine 14 is attained to, in this manner, entice milking animals present in the resting area 5 to move to the feeding area 6 and to therewith present themselves at the milking station 9.

It is not only the utilization of the milking machine capacity that is improved, the throughput of cows in the milking station 9 is also increased, and thus a modified animal selective milking decision algorithm may be employed, which takes the increased throughput into account, and according to which the frequency at which each of the milking animals is milked, can be more accurately chosen. Hereby, a higher milk production may be achieved together with, or instead of, the improved utilization.

The method is implemented in the central processing and control device 32 of the milking station 9. The condition for a low degree of utilization of the automatic milking machine 14 is entered into or determined by the central processing and control device 32 and is subsequently stored therein. Further, the processing and control device 32 is checking for the condition to be met, and when it so does the processing and control device 32 controls the automatic feeding device 38 to supply feed onto the feeding table 39.

The condition for a low degree of utilization of the automatic milking machine 14 may be determined in a number of manners. The condition may be derived from historical empirical studies of the utilization of the automatic milking machine 14 in the animal arrangement of FIG. 1 for a given herd of cows. In such a manner it may be established that the condition prevails during particular times, e.g. at noon and between 1 and 3 am. Thus, in order to increase the throughput of cows at the milking station 9 it would be particularly favorable to feed the cows by the automatic feeding device 38 as controlled by the central processing and control device 32 at such hours. It has been noticed that the characteristic sound that occurs while dropping the feed onto the feeding table 39 strongly entices the cows.

Alternatively, the condition for a low degree of utilization of the automatic milking machine 14 is determined dynamically from real-time measurements of the utilization of the automatic milking machine 14. Such condition may be established as a state, in which no milking animal is present at the milking station 9, or alternatively as a state, in which no milking animal has been present at the milking station 9 for a given period of time. Alternative low utilization conditions may be established as a state, in which a cow queue to the milking station 9, comprises fewer cows than any given number as measured by any sensor appropriate for the purpose (not illustrated), or as a state, in which there are a number of identified or unidentified cows that have not been milked for any given period of time.

Further, except of the characteristic sound arising as a result of the automatic feeding, the cows in the resting area 5 may be enticed to the feeding area 6 by means of the smell of the feed and/or by seeing the feeding and/or the feed itself. To that end the wall or fence 7 separating the resting and feeding stables have to be low enough or transparent to allow the cows to actually see the feeding and/or the feed on the feeding table 39.

It shall be appreciated that the total amounts of feed supplied during a day have to be unaltered, and thus the condition may have be to changed dynamically during each day in order to hinder overdosing of feed as well as supplying to small amounts of feed.

It shall further be appreciated that the present invention is applicable in an entirely indoor animal arrangement as well as in an entirely outdoor arrangement.

The invention claimed is:

1. A method of managing milking animals, said animals are allowed to move in an area intended therefore, said area including a resting area and a feeding area housing an automatic feeding device, said area housing a milking station including an automatic milking machine and an animal identification system, wherein said milking animals are allowed to visit individually and which a selected group of said animals have to visit in order to move from said resting area to said feeding area, said method comprising:

establishing a condition for low utilization of said automatic milking machine; and feeding said milking animals by said automatic feeding device when said condition for low utilization of said automatic milking machine is fulfilled to thereby entice milking animals in said resting area to move to said feeding area and to therewith present themselves at said milking station.

2. The method as claimed in claim 1 wherein said condition for low utilization of said automatic milking machine is established from historical empirical studies of the utilization of said automatic milking machine in said area.

3. The method as claimed in claim 1 wherein said condition for low utilization of said automatic milking machine is established dynamically from real-time measurements of the utilization of said automatic milking machine in said area.

4. The method as claimed in claim 3 wherein said condition for low utilization of said automatic milking machine is established as a state, in which no milking animal is present at the milking station.

5. The method as claimed in claim 3 wherein said condition for low utilization of said automatic milking machine is established as a state, in which no milking animal has been present at the milking station for a given period of time.

6. The method as claimed in claim 1 wherein said milking animals are fed by said automatic feeding device to thereby entice milking animals in said resting area to move to said feeding area by a characteristic sound from said automatic feeding device.

7. The method as claimed in claim 1 wherein said milking animals are fed by said automatic feeding device to thereby entice milking animals in said resting area to move to said feeding area by the smell of said feed and/or by enabling the milking animals in said resting area to see the automatic feeding and/or the feed itself.

8. The method as claimed in claim 1 wherein said milking animals are fed by a feed wagon.

9. The method as claimed in claim 1 wherein said area is located in a stable comprising a feeding stable, in which said feeding area is located, and a resting stable, in which said resting area is located, said feeding and resting stables being separated by a wall.

10. The method as claimed in claim 1 wherein said area is located outdoors and is enclosed by a fence or similar, and wherein said feeding and resting areas are separated by the fence or similar.

11. The method as claimed in claim 1 wherein each animal in the selected group of said animals, which have to visit said milking station in order to move from said resting area to said feeding area, is determined by an animal selective milking decision algorithm, and is preferably an animal which is suited to be milked.

12. A method for improving the utilization of a milking machine comprising:
   establishing a criterion for when the milking machine is utilized less frequently; and
   activating an automatic feeding device in a feeding area when the criterion is met, thereby drawing milking animals to the milking machine in order to be milked by the milking machine at a time at which the milking machine otherwise would experience low traffic of milking animals.

13. The method of claim 12 wherein the method is implemented for a milking machine located at an automated milking station.

14. The method of claim 13 wherein the method is implemented in an area, in which the milking animals are allowed to move, the area including the feeding area and a resting area and housing the automated milking station.

15. The method of claim 14 wherein said activation is made for drawing milking animals in 3he resting area to the milking machine.

16. The method of claim 12 wherein the activation of said automatic feeding device causes a characteristic sound to appear, which the milking animals rapidly associate with the presence of feed.

17. The method of claim 12 wherein the activation of said automatic feeding device causes said automatic feeding device to move, particularly along a rail mounted in a ceiling or a wall.

18. The method of claim 12 wherein the activation of said automatic feeding device causes said automatic feeding device to drop feed onto a feeding table, into a manger, or similar.

19. The method of claim 12 wherein the criterion for when the milking machine is utilized less frequently is established based on historical empirical studies of the utilization of the milking machine.

20. The method of claim 19 wherein the criterion for when the milking machine is utilized less frequently is established as time periods.

21. The method of claim 12 wherein the criterion for when the milking machine is utilized less frequently is established dynamically from real-time measurements of the utilization of the milking machine.

* * * * *